June 19, 1956     M. C. MEYER     2,750,630

METHOD OF MAKING ORNAMENTAL RINGS

Filed April 5, 1952

INVENTOR.
MAXIMILIAN C. MEYER

BY

*Greene, Pixler & Dunn*

ATTORNEYS

United States Patent Office 2,750,630
Patented June 19, 1956

2,750,630

METHOD OF MAKING ORNAMENTAL RINGS

Maximilian C. Meyer, Brooklyn, N. Y.

Application April 5, 1952, Serial No. 280,723

4 Claims. (Cl. 18—47.5)

This invention relates to a novel ornamental ring to be worn on the finger, for example, and to the process of making the same.

Among the objects of the invention is to provide an unusual type of ring made entirely of a single piece of material such as plastic or metal and a simple and effective process of making the same.

Among other objects of the invention is to provide a novel process of making an ornamental ring from a single piece of material.

These objects and others ancillary thereto are attained by providing a cylindrical piece of bendable material such as decorative plastic material, grinding or otherwise removing portions of the cylinder to provide a substantially symmetrical solid of revolution with a large ornamental center area to form the decorative part of the ring and extending side portions which will form the encircling portions. A very satisfactory method of grinding after grinding the said solid of revolution the latter is split along a plane passing through the longitudinal axis thereof to provide two equal halves. Each of the halves is then curved about the flat side to form the ring.

The rod stock employed to make the ring may be metal or plastic material or other bendable material. Among the plastic materials that may be employed the transparent or translucent plastics containing decorative particles are especially suitable. Examples of such plastic materials include the methyl methacrylates, cellulose acetate, etc. Decorative particles that may be incorporated in plastic materials may be fish scale essence, shell particles or other colorful or brilliant filler materials or similar materials. Plastic rods of various colors containing various decorative particles are available commercially.

The foregoing and other objects of the invention will be best understood from the following description of exemplifications of the same when read in connection with the accompanying drawing in which.

Figure 1:
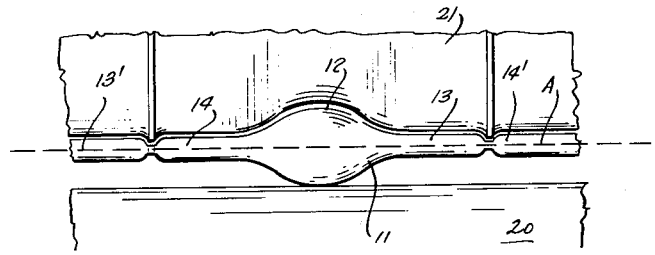
Fig. 1 is a top view illustrating the grinding step.
Figure 2:
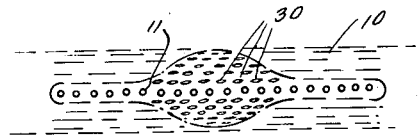
Fig. 2 is a view of a piece of rod stock from which the blank solid of revolution is formed showing the said blank in dotted lines.

In the process a rod 10 of material such as shown in Fig. 2 is ground, machined as on a lathe, or otherwise reshaped to form the blank 11 shown in Fig. 1. The blank 11 is a solid of revolution having a bulging center portion 12 and two extending side portions 13 and 14. The side portions 13 and 14 are shown as being substantially equal but it is obvious that one side could be somewhat longer than the other.

In the type of centerless grinding shown in Fig. 1 the blank 10 (not shown in Fig. 1) is rotated between the plane surface roller 20 and the grooved grinding roller 21 so that a solid of revolution having curves complementary to the curves on the surface of roller 21 is produced at the end of the grinding process. The blank or solid of revolution 11 is shown with the imaginary axis A in dotted lines. As indicated in Fig. 1, a plurality of the blanks 11 may be formed simultaneously from a single rod of the plastic material.

Thereafter the blank 11 is split along a plane parallel to the axis A to provide two ring forming blanks 30 each having the bulging center portion 12 the long side portions 13 and 14 and the flat surface 15.

Figure 3:
Fig. 3 is a side view of one of the halves of the solid of revolution.
Figure 4:
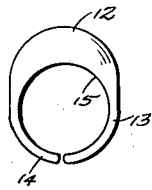
Fig. 4 is a view showing the finished product formed from the half solid of revolution of Fig. 3.
Figure 5:
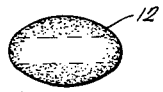
Fig. 5 is a front view of a ring made from a methyl methacrylate rod containing fish scale essence.

The blank of Fig. 3 is heated until it softens and curved, about a mandrel if desired, and towards the flat surface 15 until the ends of the side portions 13 and 14 meet and form the ring of Fig. 4. It is obvious that any kind of mechanical aid may be employed for curving the blank to form the ring.

The bulging center portion 12 can obviously take any one of a number of forms. Fig. 2 illustrates one form of decorative rod stock commercially available containing flat decorative particles 30 (greatly enlarged) which are oriented with their flat surfaces parallel to the circumferential surface of the rod. Rings made from this material have an unusually attractive appearance.

It will be seen that the invention provides a one piece decorative finger, scarf, or other ornamental ring and a simple and effective process of making it. The cross section of the ring made by a process of centerless grinding will be semicircular at any point with the flat side 15 on the inside and the curved convex side facing outwardly. Additional shapes may be imparted to the blank before or after splitting the solid of revolution obtained by centerless grinding. The cross sectional size of the ring increases from a minimum at the ends slowly at first and then rapidly to a maximum at the center portion 12. In bending the cross sectional shape may be altered and in fact the alignment of particles is ordinarily accentuated by the bending operation.

I claim:

1. A process of making an ornamental ring comprising the steps of providing a substantially solid rod of decorative material, removing portions of the material from said rod to provide at least one solid of revolution having a bulging center portion of substantially the same diameter as the original rod, and two axially extending side portions of considerably smaller diameter, cutting the said solid of revolution along a plane which includes the axis thereof to form two equal portions each having one flat side, and curving one of said half portions towards said flat surface until the ends of the side portions are adjacent one another to form a ring.

2. A process of making an ornamental ring comprising the steps of providing a substantially solid rod of decorative material, centerless grinding the rod to provide at least one solid of revolution having a bulging center portion of substantially the same diameter as the original rod, and two axially extending side portions of considerably smaller diameter, cutting the said solid of revolution along a plane which includes the axis thereof to form two equal portions each having one flat side, and curving one of said half portions towards said flat surface until the end of the side portions are adjacent one another to form a ring.

3. A process of making an ornamental ring comprising the steps of providing a substantially solid rod of decorative translucent to transparent plastic material, centerless grinding the rod to provide at least one solid of revolution having a bulging center portion of substantially the same diameter as the original rod and two axially extending side portions of considerably smaller diameter, cutting the said solid of revolution along a plane which includes the axis thereof to form two equal portions and curving one of said half portions towards said flat surface until the end of the side portions are adjacent one another to form a ring.

4. A process of making an ornamental ring comprising the steps of providing a substantially solid rod of decorative translucent to transparent plastic material containing decorative particles embedded therein, centerless grinding the rod to provide at least one solid of revolution having a bulging center portion of substantially the same diameter as the original rod and two axially extending side portions of considerably smaller diameter, cutting the said solid of revolution along a plane which includes the axis thereof to form two equal portions each having one flat side, and curving one of said half portions towards said flat surface until the end of the side portions are adjacent one another to form a ring.

References Cited in the file of this patent

UNITED STATES PATENTS

| | | |
|---|---|---|
| 1,655,677 | Dickie et al. | Jan. 10, 1928 |
| 1,925,721 | Johnston | Sept. 7, 1933 |
| 1,947,254 | Foster | Feb. 13, 1934 |
| 2,120,320 | Wood | June 14, 1938 |
| 2,164,060 | Garner | June 27, 1939 |
| 2,168,490 | Moss | Aug. 8, 1939 |
| 2,182,876 | Moldenhauer | Dec. 12, 1939 |
| 2,451,046 | Rembert | Oct. 12, 1948 |